United States Patent

Chaklader

(10) Patent No.: US 6,449,582 B1
(45) Date of Patent: Sep. 10, 2002

(54) VEHICLE WEIGHT AND CARGO LOAD DETERMINATION USING TIRE PRESSURE

(75) Inventor: Asoke Chandra Das Chaklader, Vancouver (CA)

(73) Assignee: The University of British Columbia, Vancouver (CA)

(*) Notice: Subject to any disclaimer, the term of this patent is extended or adjusted under 35 U.S.C. 154(b) by 0 days.

(21) Appl. No.: 09/567,472

(22) Filed: May 9, 2000

(51) Int. Cl.$^7$ .................................................. G01G 19/10
(52) U.S. Cl. .......................... 702/173; 702/33; 702/98; 702/101; 702/113; 702/130; 702/129
(58) Field of Search .............................. 702/33, 34, 41, 702/42, 43, 50, 98, 100, 101, 102, 113, 114, 99, 130, 136, 138, 140, 127, 129, 173–175, 182, 183, 184, 188, FOR 123, FOR 124, FOR 126, FOR 127, FOR 128, FOR 134, FOR 142, FOR 143, FOR 152, FOR 153, FOR 170, FOR 171, FOR 172; 374/141, 142, 143, 43; 700/301, 305; 340/438, 440, 600, 666; 180/290; 200/85 R; 701/37, 124; 73/146; 177/136, 137

(56) References Cited

U.S. PATENT DOCUMENTS

| | | | | |
|---|---|---|---|---|
| 4,548,079 A | * | 10/1985 | Klatt | 73/432 R |
| 4,656,876 A | * | 4/1987 | Fremd | 73/865 |
| 4,909,074 A | | 3/1990 | Gerresheim et al. | 73/146.4 |
| 4,941,365 A | * | 7/1990 | Reiner et al. | 73/865 |
| 5,081,443 A | | 1/1992 | Breit | 340/426 |
| 5,119,895 A | * | 6/1992 | Gradert | 177/208 |
| 5,215,154 A | * | 6/1993 | Kirby | 177/136 |
| 5,289,160 A | | 2/1994 | Fiorletta | 340/447 |
| 5,610,372 A | * | 3/1997 | Phillips et al. | 177/25.14 |
| 5,675,314 A | | 10/1997 | Chaklader | 340/443 |
| 5,780,782 A | * | 7/1998 | O'Dea | 177/136 |
| 5,780,783 A | * | 7/1998 | Heider et al. | 177/137 |
| 5,929,388 A | * | 7/1999 | Uehara et al. | 177/136 |
| 6,025,563 A | * | 2/2000 | Lesesky et al. | 177/136 |
| 6,144,928 A | * | 11/2000 | Leimbach et al. | 702/173 |

FOREIGN PATENT DOCUMENTS

| | | | |
|---|---|---|---|
| JP | 06341883 | * | 12/1994 |
| JP | 10160555 | * | 6/1998 |
| JP | 10267739 | | 10/1998 |
| JP | 11258029 A | * | 9/1999 |
| JP | 2000283831 | * | 10/2000 |

* cited by examiner

*Primary Examiner*—Marc S. Hoff
*Assistant Examiner*—Carol S Tsai
(74) *Attorney, Agent, or Firm*—C. A. Rowley (57) ABSTRACT

A method for measuring the weight of a vehicle and/or of its load comprising measuring the temperature and pressure of at least a significant number of tires of said vehicle, a temperature standardized pressure based on a selected standardization temperature, summing the standardized pressures and determining weight of the vehicle and/or its load based on the sum of the temperature compensated pressures and a conversion factor.

6 Claims, 5 Drawing Sheets

VEHICLE WEIGHT AND CARGO LOAD DETERMINATION USING TIRE PRESSURE

FIELD OF INVENTION

This invention relates to the method and apparatus for determining the weight of the vehicle and/or the cargo load based on the tire pressure and temperature.

BACKGROUND OF THE INVENTION

Many different systems have been designed to measure the tire pressures of a vehicle and relay this information to the operator, see for example U.S. Pat. No. 5,675,314 issue Oct. 7 1997 to Chaklader or U.S. Pat. No. 5,289,160 issued Feb. 22, 1994 to Fiorletta. U.S. Pat. No. 4,909,074 issued Mar. 20, 1990 to Gerresheim et al. describes a specific application of sensed tire pressure wherein curves based on atmospheric temperature are used to determine safe driving conditions for the tires under the then current atmospheric conditions.

U.S. Pat. No. 5,081,443 issued Jan. 14, 1992 to Breit describes a specific tire pressure and temperature sensor and system wherein the tire pressure and temperature are both monitored as well as other outside and cab conditions. The measured tire temperature and pressure are used for two different and unrelated functions; the temperature is used to monitor the brake function while the pressure is used to monitor the weight of the cargo. The concept of measuring the weight of the vehicle based on the tire pressure has also been described in Japanese patent no. JP10267739 published Oct. 9, 1998. Inventor Tsukasa teaches that the tire pressure may be used to determine the weight of or load on a vehicle. None of the existing systems compensate for tire temperature which can significantly alter the tire pressure in determining the weight of the vehicle based on the tire pressures and thus a significant error can be included in the measured load weight obtained by practicing the teachings of the above patents of Breit and Tsukasa.

BRIEF DESCRIPTION OF THE PRESENT INVENTION

It is an object of the present invention to provide a more accurate system for measuring the weight of the vehicle and/or of its load based tire pressure. More specifically, it is an object of the present invention to provide a more accurate system for measuring the weight of the vehicle and/or of its load based tire pressure. Broadly, the present invention relates to a method for measuring the weight of a vehicle based on change in tire pressure comprising, measuring tire pressure and temperature of at least a significant number of tires on a vehicle, determining a temperature standardized pressure P(s) based on a selected standard temperature for each tire, totaling said temperature standardized pressures for said tires $P_{(S)TOTAL}$ and determining total weight $W_{TOTAL}$ of said vehicle based on $$W_{TOTAL} = C_F(\Delta P_{(S)TOTAL})$$

Where $W_{TOTAL}$=total weight of said vehicle $\Delta P_{(S)TOTAL}$=total or summation of all of said temperature standardized tire pressures $P_{(S)}$ less the summation $P_{I(S)TOTAL}$ of the initial tire pressures $P_I$ measured with no load on the tires converted to temperature standardized pressures $P_{I(S)}$ and summed to provide a summation of initial pressures $P_{I(S)TOTAL}$ $C_F$=a conversion factor of weight/unit change of standardized tire pressures.

Preferably, said method further comprises determining the weight of the vehicle alone $W_V$ and determining the weight of cargo $W_C$ based on $$W_C = W_{TOTAL} - W_V$$

Preferably, said weight of the vehicle alone $W_V$ is determined by initially measuring initial tire pressure $P_I$ of each said tire under conditions of no load, determining said temperature standardized initial pressure $P_{I(S)}$ for said selected standard temperature for each of said tires, measuring pressure $P_V$ in said tires when said tires are subject only to the weight of the vehicle $W_{(V)}$ and determining a standardized pressure $P_{V(S)}$ for each said tire based on $P_V$ in said tires and determining weight of said vehicle $W_V$ based on the equation $$W_V = C_F(P_{V(S)TOTAL} - P_{I(S)TOTAL}) = C_F(\Delta P_{V(S)TOTAL})$$

Wherein $W_V$=Vehicle weight $P_{I(S)TOTAL}$=is the sum or total of said initial standardized pressures $P_{I(S)}$ for said tires under no load $P_{V(S)TOTAL}$=the sum or total of said temperature standardized pressures $P_{V(S)}$ of said tires $\Delta P_{V(S)TOTAL}$=the change in total of the temperature standardized tire pressures based measured with only the weight of the vehicle over initial temperature standardized pressures under no load i.e. $P_{V(S)TOTAL} - P_{I(S)TOTAL}$ $C_F$=said conversion factor of unit weight/unit change of standardized tire pressures.

Preferably, said conversion factor $C_F$ is determined by measuring said weight of the vehicle alone $W_V$, initially measuring initial tire pressure $P_I$ of each said tire under conditions of no load, determining said temperature standardized initial pressure $P_{I(S)}$ for said selected standard temperature for each of said tires, measuring pressure $P_V$ in said tires when said tires are subject only to said weight of the vehicle alone $W_{(V)}$ and determining a standardized pressure $P_{V(S)}$ for each said tire based on $P_V$ in said tires and determining said conversion factor $C_F$ based on the equation $$C_F = W_V / (P_{V(S)TOTAL} - P_{I(S)TOTAL}) = W_V / (\Delta P_{V(S)TOTAL})$$

Wherein $W_V$=Vehicle weight $P_{I(S)TOTAL}$=is the sum or total of said initial standardized pressures $P_{I(S)}$ for said tires under no load $P_{V(S)TOTAL}$=the sum or total of said temperature standardized pressures $P_{V(S)}$ of said tires $\Delta P_{V(S)TOTAL}$=the change in total of the temperature standardized tire pressures based measured with only the weight of the vehicle over initial temperature standardized pressures under no load i.e. $P_{V(S)TOTAL} - P_{I(S)TOTAL}$ $C_F$=said conversion factor of weight/unit change of standardized tire pressures.

Preferably, said determining said weight of cargo $W_C$ is based on the equation $$W_C = C_F[P_{T(S)TOTAL} - (P_{V(S)TOTAL})] = C_F(\Delta P_{C(S)TOTAL})$$

Wherein $W_C$=weight of the cargo $P_{V(S)TOTAL}$=the total of said temperature standardized pressures $P_{V(S)}$ of said tires measure when only load on the tire is the vehicle (i.e. no load on the vehicle)

$P_{T(S)TOTAL}$=the total of said temperature standardized pressures $P_{T(S)}$ of said tires measured under full load (i.e. vehicle plus cargo).

$\Delta P_{C(S)TOTAL}$=the change in total of the temperature standardized tire pressures $P_{T(S)TOTAL} - P_{V(S)TOTAL}$ due to the weight of the cargo and $C_F$=said conversion factor of unit weight/unit change of standardized tire pressures.

Preferably, said determining said weight of cargo $W_C$ is based on the equation $$C_{FT}\Delta P_{(ST)TOTAL} = C_{F1}(\Delta P_{(S1)}) + C_{F2}(\Delta P_{(S2)}) + C_{F3}(\Delta P_{(S3)}) + \cdots + C_{Fn}(\Delta P_{(Sn)})$$

Where $\Delta P_{(ST)TOTAL}$=total of the temperature corrected changes in individual tire pressures.

$C_{FT}$=a conversion factor based on change in weight/unit change of standardized tire pressures based on the weighted average of $C_{F1}$, $C_{F2}$, $C_{F3}$ - - - $C_{F1}$ and is in effect equivalent to $C_{FT} = [C_{F1}(\Delta P_{(S1)}) + C_{F2}(\Delta P_{(S2)}) + C_{F3}(\Delta P_{(S3)}) + \cdots + C_{Fn}(\Delta P_{(Sn)})]/\Delta P_{(ST)TOTAL}$ $C_{F1}$, $C_{F2}$, $C_{F3}$ - - - $C_{Fn}$ are predetermined specific values of a conversion factor $C_F$ for each of the tires 1, 2, 3 - - - n respectively.

Preferably, said weight of the vehicle alone $W_V$ is determined by initially measuring initial tire pressure $P_I$ of each said tire under conditions of no load, determining said temperature standardized initial pressure $P_{I(S)}$ for said selected standard temperature for each of said tires, measuring pressure $P_V$ in said tires when said tires are subject only to the weight of the vehicle $W_{(V)}$ and determining a standardized pressure $P_{V(S)}$ for each said tire based on $P_V$ in said tires and determining weight of said vehicle $W_V$ based on the equation $$W_V = [C_{F1}(P_{V(S1)}) + C_{F2}+(P_{V(S2)}) + C_{F3}(P_{V(S3)}) + \cdots + C_{Fn}(P_{V(Sn)})] - [C_{F1}'(P_{I(S1)}) + C_{F2}'(P_{I(S2)}) + C_{F3}'(P_{I(S3)}) + \cdots + C_{Fn}'(P_{I(Sn)})]$$

Wherein $W_V$=Vehicle weight $P_{V(S1)}$, $P_{V(S2)}$, $P_{V(S3)}$, - - - $P_{V(Sn)}$=the temperature standardized tire pressures measured with only the weight of the vehicle.

$P_{I(S1)}$, $P_{I(S2)}$, $P_{I(S3)}$, - - - $P_{I(Sn)}$=is the respective initial standardized pressures $P_{I(S)}$ for each of said tires under no load.

$C_{F1}$, $C_{F2}$, $C_{F3}$, - - - $C_{Fn}$ are the conversion factors at the corresponding pressure $P_{V(S1)}$, $P_{V(S2)}$, $P_{V(S3)}$, - - - $P_{V(Sn)}$, respectively.

$C_{F1}'$, $C_{F2}'$, $C_{F3}'$ - - - $C_{Fn}'$ are the conversion factors at the corresponding pressure $P_{I(S1)}$, $P_{I(S2)}$, $P_{I(S3)}$, - - - $P_{V(Sn)}$, respectively.

Preferably, said weight of cargo $W_C$ is determined based on the equation $$W_C = [C_{F1}(P_{T(S1)}) + C_{F2}(P_{T(S2)}) + C_{F3}(P_{T(S3)}) + \cdots + C_{Fn}(P_{(Sn)})] - [C_{F1}'(P_{V(S1)}) + C_{F2}'(P_{V(S2)}) + C_{F3}'(P_{V(S3)}) + \cdots + C_{Fn}'(P_{V(Sn)})]$$

Wherein $W_C$=weight of the cargo $P_{T(S1)}$, $P_{T(S2)}$, $P_{T(S3)}$, - - - $P_{T(Sn)}$=the temperature standardized pressures measured under full (total) load (i.e. vehicle plus cargo).

$P_{V(S1)}$, $P_{V(S2)}$, $P_{V(S3)}$, - - - $P_{V(Sn)}$=the temperature standardized tire pressures measured with only the weight of the vehicle.

$C_{F1}$, $C_{F2}$, $C_{F3}$, - - - $C_{Fn}$ are the conversion factors at the corresponding pressure $P_{T(S1)}$, $P_{T(S2)}$, $P_{T(S3)}$, - - - $P_{T(Sn)}$, respectively.

$C_{F1}'$, $C_{F2}'$, $C_{F3}'$ - - - $C_{Fn}'$ are the conversion factors at the corresponding pressure $P_{V(S1)}$, $P_{V(S2)}$, $P_{V(S3)}$, - - - $P_{V(Sn)}$, respectively.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Basic Principles:

The tire pressure monitoring system, as a load weighing device, can be used by considering the combined weight of the vehicle and cargo load, and how these affect the tire pressure of a vehicle. The principal will be broadly described with reference to FIG. 1, but as will be apparent, the principle applies to any number of tires the vehicle may have.

Figure 1:
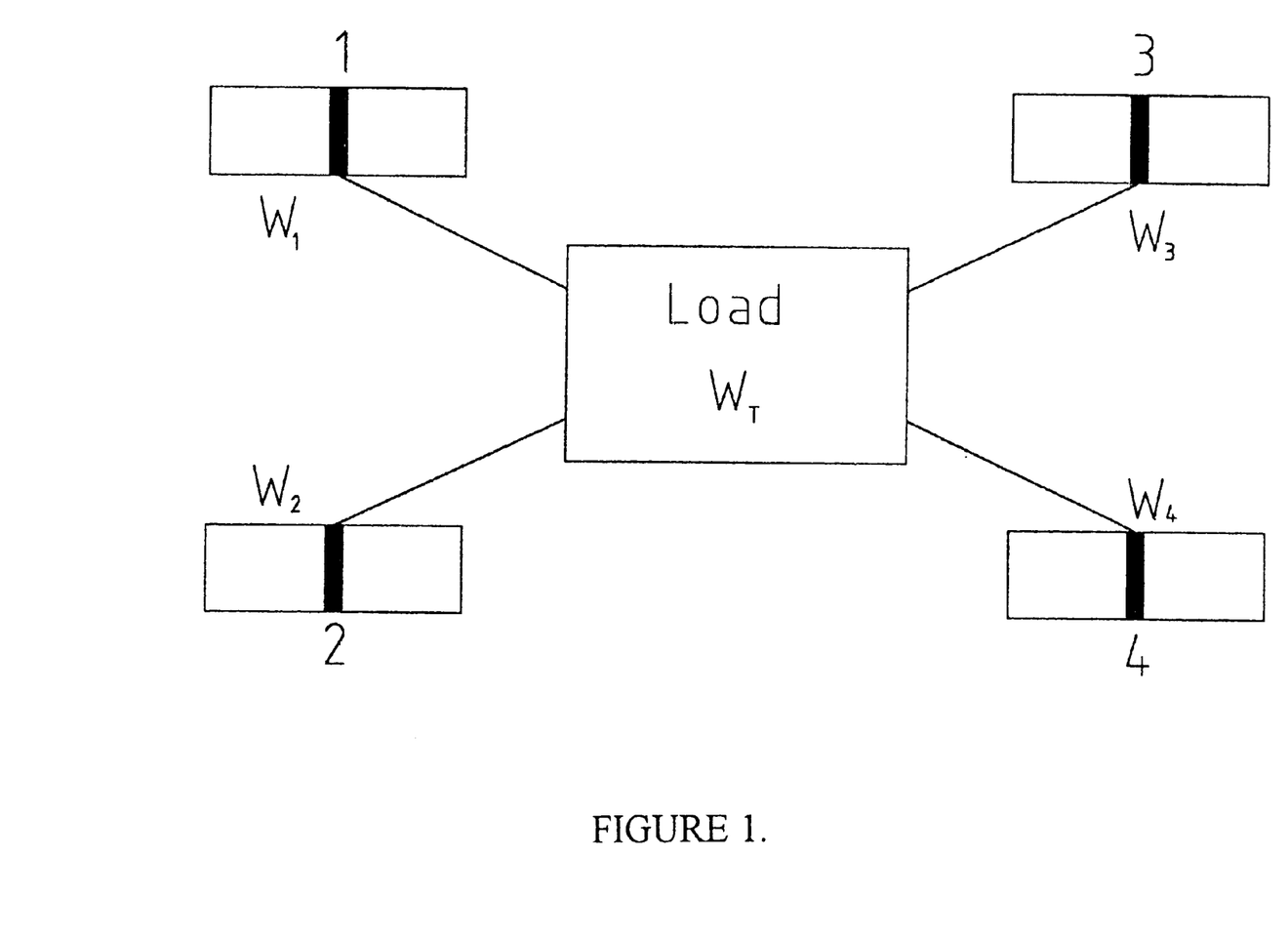
FIG. 1 is a schematic illustration of some of the basic principles used in the application of the present invention applied to a 4-wheeled vehicle.

As shown in FIG. 1, the total weight ($W_T$) of the vehicle (including any load) is supported by the four tires 1, 2, 3 and 4 and the weight carried by each tire is indicated at $W_1$, $W_2$, $W_3$ and $W_4$ respectively, through the vehicle chassis and axles (not shown). The tires rest on the ground. Therefore, all weight is transferred to the compressed air within the tires (and the wheel rims) and then to the ground. The tires themselves generally do not carry any significant amount of the load, as loss of the air pressure within the tire results in a flat tire. However, the new zero pressure run-flat tire can support the weight of the car by reinforced ribs introduced within the body of the rubber for a short while.

The total weight of the vehicle, $W_{TOTAL}$, if symmetrically distributed to all tires, is $W_1 + W_2 + W_3 + W_4 = W_{TOTAL}$, where $W_1 = W_2 = W_3 = W_4 = W_{TOTAL}/4$. This is shown in FIG. 1. But, in general, the load is not distributed symmetrically as, for example, the engine, clutch and transmission gear are all located in the front end of the vehicle. Thus, for passenger cars, the front two tires are subjected to a higher load than the rear tires. For a loaded truck, the load would be heavier on the rear tires. Irrespective of the situation, the following condition (for any number of tires) must satisfy $$W_{TOTAL} = W_1 + W_2 + W_3 + W_4 + \cdots + W_n$$

The above explanation is provided to assess the suitability of knowing the pressures of all tires and then using this information to determine the vehicle weight and cargo load on a truck or trailer. It is apparent from the above, that all weight is being transferred to the compressed air in the tire. Therefore, if the vehicle is loaded with cargo, this additional weight will be borne by the compressed air of the tire (i.e. the pressure should change with any variation of load). As can be expected, when measuring the tire pressure, sensors in wheels of an automobile, while on the hoist, give different tire pressure readings from when it is lowered to the ground. The pressures in the tires (depending on the size and weight of the vehicle) increase between 0.5 and 1.0 pound on each tire as the weight of the car is transferred to the compressed air in the tires. Thus, in order to calculate the weight ($W_V$) of the vehicle, the pressure changes ($\Delta P$'s) in all tires as a result of applying the weight of the vehicle to the tires have to be summed up.

$$W_V = \Sigma C_{Fi}\Delta P_{Vi} = (C_{F1}\Delta P_{V1} + C_{F2}\Delta P_{V2} + C_{F3}\Delta P_{V3} + \cdots + C_{Fn}\Delta P_{Vn}),$$

and $$= C_F \Delta P_{VTOTAL}$$

Where $C_{Fi}$=the conversion factor at the local tire pressure of the ith tire $C_F$=a conversion factor in weight/unit change in tire pressure (discussed below) to obtain the vehicle weight.

$\Delta P_{V1}$, $\Delta P_{V2}$ etc.=the change in pressure in each of the tires (1, 2, 3, - - - n) resulting from vehicle weight only (i.e. tire pressure with the vehicle on the ground minus the initial tire pressure when the vehicle is supported on a hoist or the like or before the tires are installed on the vehicle.

$\Delta P_{VTOTAL}$=the summation of the pressure changes $\Delta P_{V1}$, $\Delta P_{V2}$ etc.

Initially, the value for $C_F$ may be determined by weighing the empty vehicle to provide $W_V$ and using the known values of $W_V$ and $\Delta P_{VTOTAL}$ to calculate $C_F$. Preferably, the values for the pressures $\Delta P_{V1}$, $\Delta P_{V2}$, etc. will be tire temperature standardized pressures as described below (in the current example, the standardizing temperature and the existing cold tire temperature are considered the same)

The summed up value of the all tire pressure changes, $\Delta P_{VTOTAL}$, can be used to calculate the weight of the vehicle $W_V$ by multiplying it ($\Delta P_{VTOTAL}$) with conversion factor $C_F$. This value $W_V$ can be stored in the memory of the on board computer 20 (see FIG. 2) so that it can be used subsequently for cargo load calculation. Obviously, as above indicated, the tare weight of the vehicle (i.e. weight of the vehicle per se) may also be obtained by simply weighing the empty vehicle and storing this value $W_V$ in the memory of the on board computer 20 (see FIG. 2). In other words, to calculate the vehicle weight $W_V$, one may measure the pressures of all tires separately and sum up, either before installing the tires on the vehicle or while the vehicle is on the hoist, and subtract this total value of the initial pressures $P_{ITOTAL}$, from the total pressure of all tires $P_{VTOTAL}$ while the vehicle is on the ground. A software program will be installed which is able to do this either way or both ways.

Once the tare weight of the vehicle is determined it may not be necessary to determine it again.

Now in addition, if there is a cargo load on the vehicle, then the total weight is $$W_{TOTAL} = W_V + W_C = C_F \Delta P_{TOTAL} = C_F(\Delta P_V + \Delta P_C)$$

Where $W_C$=Cargo weight, $\Delta P_{TOTAL}$=the summation of the changes in tire pressures in all of the tires from the initial tire pressure $P_I$ (without the vehicle or vehicle on the hoist) to the tire pressure of the loaded vehicle i.e. $\Delta P_{TOTAL}=(\Delta P_{V+\Delta PC})$ $\Delta P_C$=the tire pressure change due to cargo load, and $\Delta P_V$ and $C_F$ are as above defined Thus, the weight of the cargo $W_C$ will be $W_C = W_{TOTAL} - W_V$ To calculate the vehicle weight $W_V$ and/or cargo load $W_C$, it is necessary to measure the tire pressure accurately. The tire pressure increase from the vehicle weight and cargo load is relatively small and therefore accurate pressure sensors have to be used and they are commercially available. These sensors can give an output with an accuracy of several millivolts per unit pressure in a tire. This will allow accurate determination of the pressure change associated with the vehicle weight and cargo load.

Factors That Affect Cargo Load Determination:

In addition to the weight of the vehicle and cargo load, as discussed above, there are three other factors that may affect the pressure in a tire. They are, (i) temperature (ii) inclination of the ground and (iii) altitude.

Temperature

The effect of tire temperature has not been considered in the above basic analysis, but is a very important factor in obtaining acceptable pressure values since without compensating for change (rise or fall) in temperature the accuracy of the system is unacceptable and therefore temperature change must be accommodated.

In order to calculate a cargo load value $W_C$ after driving some distance, it is necessary to compensate for the temperature rise of the air in the tires to permit the system to be used when the tire is hot (or cold) and the tire pressure has changed because of heating (cooling). A preferred system that may be used is as follows:

The total weight of the vehicle (vehicle+cargo) without temperature compensation is:

$$W_{TOTAL} = W_V + W_C = C_F(\Delta P_{TOTAL}) = C_F(\Delta P_{VTOTAL} + \Delta P_{CTOTAL})$$

Where $W_{TOTAL}$=Total weight of the vehicle and cargo $W_V$=vehicle weight or weight of the empty vehicle $W_C$=weight of the cargo per se $\Delta P_{TOTAL}$=the total or sum of the pressures in each of the tires less the sum ($P_{I\ TOTAL}$) of the initial tire pressures $P_I$ measured with no load on the tires, or $\Delta P_{VTOTAL} + \Delta P_{CTOTAL}$ $\Delta P_{VTOTAL}$=the sum of the tire pressures $P_V$ measured with only the vehicle supported by the tires less the sum $P_I$ $_{TOTAL}$ of the initial tire pressures $P_I$ measured with no load on the tires i.e. the sum of the changes in tire pressures due to the weight of the vehicle per se $\Delta P_{C\ TOTAL}$=the sum of the changes in tire pressure due to the addition of the load onto the vehicle, and $C_F$=a conversion factor for converting tire pressure to weight based on change in weight/unit change in tire pressure The value of $P_{TOTAL}$ changes with increase or decrease in load and also as the tires get hot as normally occurs in use (or cold, when parked in a cold environment). If the pressures in the tires are measured by pressure transducers i.e., sensors, then the value of the output of the sensors which is normally transmitted in millivolts ($mV_{TOTAL}$) will also change because of change of pressure.

To compensate for these changes in temperature, using the tire pressure monitoring system of the present invention, each measured value of pressure is converted to a selected temperature standardized pressure by measuring the temperature of the air in the tire at the same time as the pressure is sensed and using a suitable software program that converts all these measured pressures to selected standard temperature values based on the Universal Gas Law.

It is most likely that different tires will have different pressures. In addition, the temperature of each tire may be different after driving. To accommodate this, the pressure of each tire and their corresponding temperatures are measured by the tire pressure monitoring system and each is converted to the selected standard temperature pressure value based on Universal Gas Law by a suitable computer program, and these standardized pressure values $P_{(S)}$ can be summed up to provide a standardized value of the total of these standardized pressures $-P_{(S)TOTAL}$.

In this system all of the values for pressure (the values of P) will be standardized to $P_{(S)}$ values i.e. and the pressures $P_V$, $P_C$ and $P_T$ standardized to $P_{V(S)}$, $P_{C(S)}$ and $P_{T(S)}$ respectively, at the selected standard value for temperature.

Any desired standardizing temperature may be selected and used. If it is the temperature at which the initial pressure $P_I$ is measured, then obviously the measured the pressure $P_I$ is the same as the pressure converted to the temperature standard i.e. $P_I = P_{I(S)}$ Thus the cargo load $W_C$ may be determined based on $$W_C = C_F(\Delta P_{C(S)TOTAL})$$
$$= C_F[P_{T(S)TOTAL} - (P_{V(S)TOTAL} + P_{I(S)TOTAL})]$$

where $\Delta P_{C(S)TOTAL}$=the sum of the changes in total temperature standardized tire pressure due solely to the weight of the cargo $P_{T(S)TOTAL}$=the sum of the temperature standardized pressures $P_{T(S)}$ of the loaded vehicle (i.e. vehicle and cargo).

$P_{V(S)TOTAL}$=the sum of the temperature standardized pressures $P_{V(S)}$ of the vehicle carrying no load.

$P_{I(S)TOTAL}$=the sum of the temperature standardized tire pressures $P_{I(S)}$ measured with no weight on the tires $C_F$=a conversion factor based on change in weight/unit change in tire pressure The temperature compensation or standardization of the pressures to a selected standardization temperature can be accomplished by employing tire pressure sensors that also automatically compensate or standardize their output to a selected standardizing temperature. Manufacturers have indicated that they can supply such pressure sensors to provide the temperature standardized pressure readings i.e. values for $P_{I(S)}$, $P_{V(S)}$ and $P_{C(S)}$ directly with no technical difficulty. Obviously in this case the computer itself need not be programmed to make the conversion.

Alternatively, a temperature sensor (e.g., thermocouple) can be included with the pressure sensor for each tire, which will be an integral part of the system. Each tire can be identified numerically or alphabetically and the tire pressure will be corrected individually for temperature sensed as discussed above.

The weight of a vehicle and/or its cargo may also be determined by a substantially equivalent system to that described above with no external temperature compensation using the software by using special pressure sensors, which have built-in self-temperature compensation capabilities.

From the tare weight of the vehicle (already known), the conversion factor $C_F$ may determined as above described by measuring the tire pressures $P_V$ and temperatures of the unloaded vehicle, converting these measured pressures to temperature standardized pressures $P_{V(S)}$ as described above based on a selected standard temperature, totaling said temperature standardized pressures $P_{V(S)}$ to obtain a total of such standardized pressures of said tires $P_{V(S)TOTAL}$ and equating $$W_V = C_{F(S)}(P_{V(S)TOTAL})$$

Where $W_V$=measured weight of said vehicle per se $P_{V(S)TOTAL}$=total or summation of all of said temperature standardized tire pressures $P_{V(S)}$ $C_{F(S)}$=a conversion factor based on change in weight/unit change of standardized tire pressures.

This tare weight of the vehicle can be measured directly or vehicle weight $W_V$ and is necessary if $C_F$ is to be determined.

Similarly the weight of the cargo per se could be obtained by simply based on $$W_C = W_{TOTAL} - W_V$$
$$= C_F(P_{T(S)TOTAL}) - C_F(P_{V(S)TOTAL})$$
$$= C_F(P_{T(S)TOTAL}) - W_V$$
$$= C_F(\Delta P_{C(S)TOTAL})$$

Where $W_V$=measured weight of said vehicle per se $W_{TOTAL}$=total weight of the vehicle and cargo $P_{T(S)TOTAL}$=total or sum of the temperature standardized pressures measured with the vehicle carrying the cargo $P_{T(S)}$ $P_{V(S)TOTAL}$=total or summation of all of said temperature standardized tire pressures $P_{V(S)}$ measured with the tires supporting only the weight of the empty vehicle $\Delta P_{C(S)TOTAL}$=change in total temperature standardized tire pressure due solely to the weight of the cargo $C_F$=a conversion factor based on change in weight/unit change of standardized tire pressures.

The software will calculate the total load and the tare weight may be stored in memory and used to determine the load or cargo weight $W_C$.

The driver can then add or deliver a load and get the new value of $\Delta P_{T(S)TOTAL}$. The new value of $\Delta P_{T(S)TOTAL}$ will be either positive (+), if load is added, or negative (−), if cargo is delivered. From the difference of these values, the weight of the cargo either delivered or picked up can be determined and will be shown on the LCD panel as will be described below (see FIG. 2). The entire system will be programmed in software and the driver will not have to do anything except to push one or two buttons.

Inclination

The system may also incorporate a "magneto-inductive sensor" to compensate for any inclination and/or tilt on the roadbed or on any surface where the vehicle is parked. In this case, the value of the total change of $\Delta P_{TOTAL}$ can be corrected to take into account the effect of any inclination and/or tilt of the ground on which the vehicle is resting. This will also be done by programming in the software. For multiple vehicles, it may be necessary to install one unit of "magneto-inductive sensor", for each vehicle for the correction of inclined (and/or tilt) road or parking surface.

Figure 3:
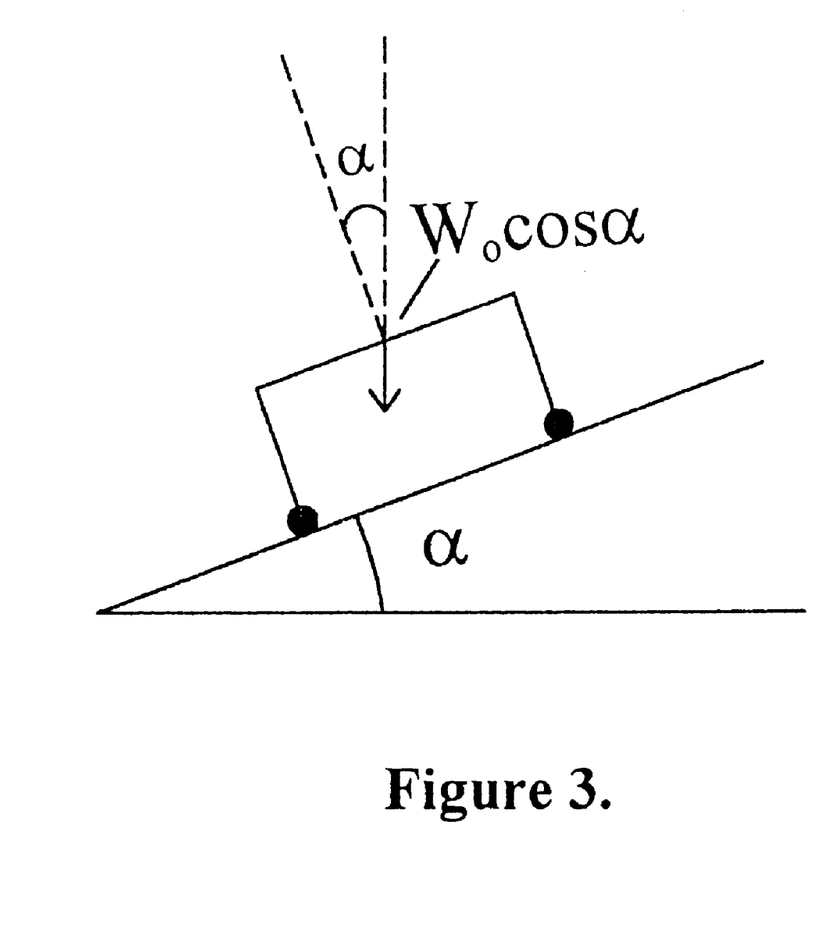
FIG. 3 is a schematic illustration showing how the grade on which the vehicle is parked may influence the use of tire pressure in determining vehicle weight.

Alternatively, from the knowledge of all tire pressures on a level ground, the distribution of the weight on a truck or trailer and hence, the location of the center of gravity, can be determined. Any inclination (including tilt) can be known from the relative direction of the gravitational force and be compensated for by the program. The effect of the inclination of a parked truck on the weight is schematically shown in FIG. 3. Because of the inclination of the surface by an angle α, the total original weight of the truck $W_o$, (on a level surface) with its cargo becomes $W_o \cos\alpha$. Thus, if desired, it is also possible to compensate for inclination (including tilt) of the vehicle should it be parked on a slope, by sensing the slope, for example, by using an inclinometer 50 such as a "magneto-inductive sensor" and adjusting the values based on the angles sensed.

Ambient Pressure

A barometer measuring ambient pressure outside the vehicle can also be introduced into the system for correction, if needed, for usage at high altitude locations. However, the altitude correction will be very small. A simple calculation shows that even at an elevation of 2 miles, the error in weight would be around 0.1% and under normal circumstances may be omitted.

Conversion factor $C_F$

The conversion factor $C_F$ may be determined as above described and as follows.

The initial tire pressures $P_I$, i.e. with no load on the tires, and their temperatures are measured and the measured pressures $P_I$ are temperature standardized to the selected temperature to provide temperature standardized initial pressures $P_{I(S)}$ as described above and totaled to provide a sum of $P_{I(S)}$ equal to $P_{I(S)TOTAL}$. The tare weight of the vehicle is determined by weighing the unloaded vehicle. The tire pressures $P_V$ and temperatures of the unloaded vehicle are measured, i.e. the vehicle only supported by the tires, and are converted to temperature standardized pressures $P_{V(S)}$ as described above based on the selected standard temperature. Temperature standardized pressures $P_{V(S)}$ are summed or totaled to obtain a total of such standardized pressures said tires $P_{V(S)TOTAL}$. The value of the conversion factor $C_F$ may then be obtained based on the equation $$W_V = C_F(P_{V(S)TOTAL} - P_{I(S)TOTAL})$$

$$C_F = W_V/(P_{V(S)TOTAL} - P_{I(S)TOTAL}) \quad (1)$$

This provides a conversion factor $C_F$ in change in weight-1unit change of standardized tire pressure.

Alternatively, the conversion factor $C_F$ may be determined by weighing the empty vehicle to obtain its tare weight, measuring the tire temperatures and pressures under these conditions to provide measured pressures $P_V$, converting these pressures to temperature standardized pressures $P_{V(S)}$ (if required) and summing these pressures to provide at total pressure $P_{V(S)TOTAL}$. The vehicle is then loaded with a given amount of pre-weighed load and weighed again to provide a loaded or total weight $W_{TOTAL}$ which is the total weight of the vehicle with cargo, which is larger than $W_V$. The tire temperatures and pressures under these conditions are measured to provide measured pressures P, converting these pressures to temperature standardized pressures $P_{T(S)}$ and summing these pressures to provide at total pressure $P_{T(S)TOTAL}$. The based on the equations $$W_C = W_{TOTAL} - W_V \quad (2)$$

$$= C_F(P_{T(S)TOTAL} - P_{V(S)TOTAL})$$

$$C_F = W_C/(P_{T(S)TOTAL} - P_{V(S)TOTAL})$$

Since the only unknown is $C_F$, the value of $C_F$, the change in weight/unit change temperature standardized tire pressure may easily be calculated.

Equations (1) and (2) are substantially equivalent ways of determining $C_F$, thus where $C_F$ is defined as being determined by equation (1) elsewhere in the disclosure or claims, it is intended to define or include equation (2)

A third alternative, which will give a more accurate value of the cargo weight, is given below.

Figure 5:
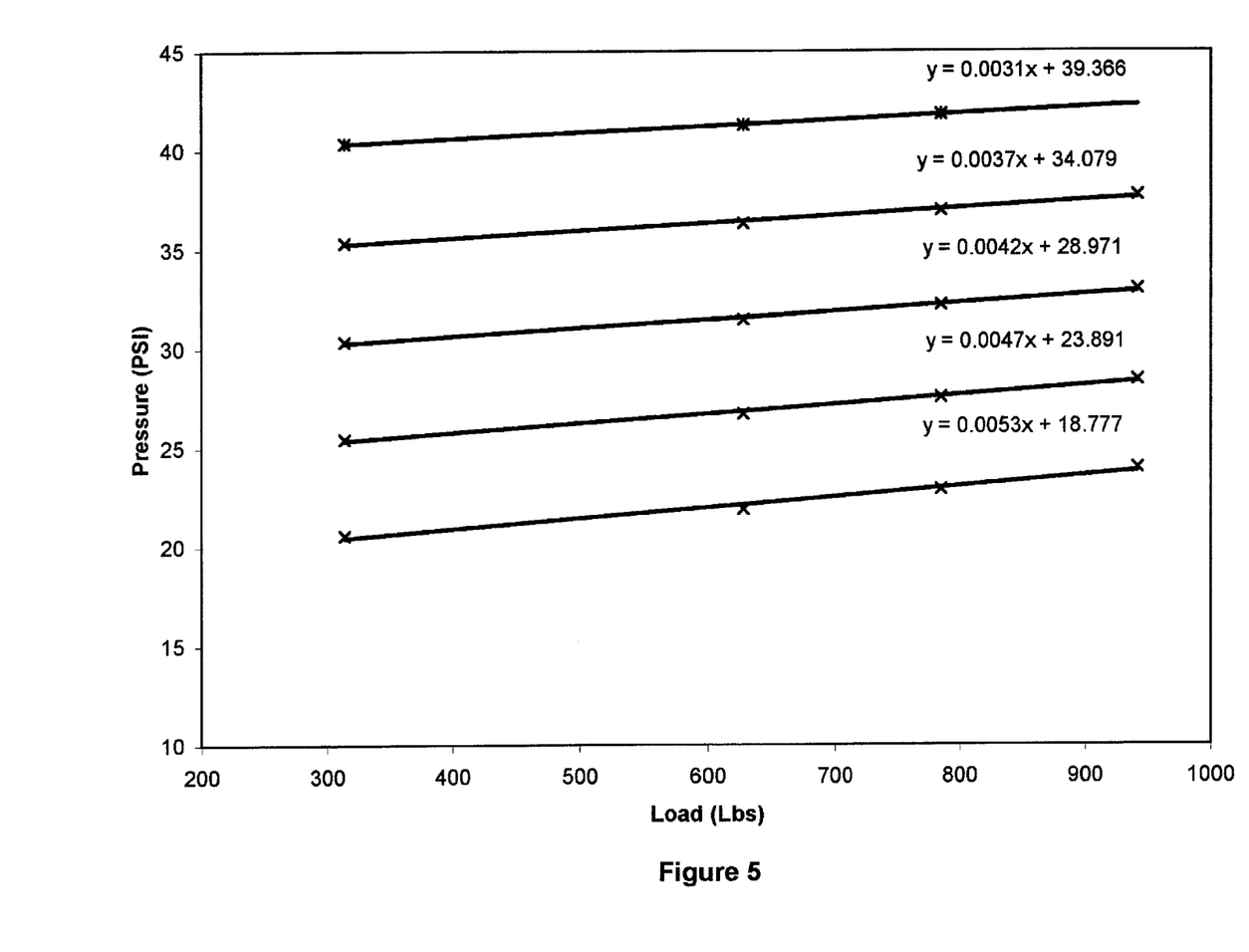
FIG. 5 is a plot of tire pressure (pounds per square inch (psi)) verses load (pounds) indicating the substantially straight line relationship.

The determination of the value of $C_F$ by the two methods, as described above, will give an average value of $C_F$. These methods of determining $C_F$ may be adequate for a large number of applications. However, as shown in FIG. 5, based on actual measurements for the type of sensors used, the value of $C_F$, which is the inverse of the slope of the lines, varies with any pressure change in the tire. Thus, it will be apparent that $C_F$ is not a constant. For example, the initial air pressure existing in the tire and the air pressure when a load is applied on the tire will produce different $C_F$ values.

It is not uncommon to have different pressures in different tires in a vehicle. Furthermore, when the vehicle is driven, motion-induced heating will produce different tire pressures in these tires (as above described), possibly due to different amounts of heating and because of different initial tire pressures. So, for accurate calculation of cargo weight it would be appropriate to use different $C_F$ values for each tire, according to their initial pressure and final pressure, values, as shown below.

$$C_{FT}\Delta P_{(ST)TOTAL} = C_{F1}(\Delta P_{(S1)}) + C_{F2}(\Delta P_{(S2)}) + C_{F3}(\Delta P_{(S3)}) + \cdots + C_{Fn}(\Delta P_{(Sn)})$$

Where $\Delta P_{(ST)TOTAL}$ the sum of the total of the temperature corrected changes in all individual tire pressures.

$C_{FT}$ = a calibration factor based on change in weight/unit change of standardized tire pressures based on the weighted average of $C_{F1}, C_{F2}, C_{F3} \cdots C_{F1}$ and is in effect equivalent to $C_{FT} = [C_{F1}(\Delta P_{(S1)}) + C_{F2}(\Delta P_{(S2)}) + C_{F3}(\Delta P_{(S3)}) + \cdots + C_{Fn}(\Delta P_{(Sn)})]/\Delta P_{(ST)TOTAL}$ $C_{F1}, C_{F2}, C_{F3} \cdots C_{Fn}$ are predetermined specific values Of $C_F$ for each of the tires 1, 2, 3 - - - n respectively.

This means from the knowledge of the initial (empty or loaded vehicle) pressures and subsequent heat-induced (after driving some distance) pressures of each tire, the new heat-induced value of $C_F$ for each tire as shown in FIG. 5 will be known and stored in memory in the computer, based on the initial pressure $P_I$ in the respective tire and then normalized or corrected for the temperature rise based on the stored values FIG. 5). Then, when the value of $C_F$ based on the corrected of value $P_{(S)}$ is used in multiplying ($P_{T(S)TOTAL} - P_{V(S)}$.) the final value of $W_C$ can be determined, which should be the same as when the trip started.

It will be apparent that the vehicle alone $W_V$ may be determined initially measuring initial tire pressure $P_I$ of each said tire under conditions of no load, determining temperature standardized initial pressure $P_{I(S)}$ for each of said tires, measuring pressure $P_V$ in the tires when said tires are subject only to the weight of the vehicle $W_{(V)}$ and determining a standardized sure $P_{V(S)}$ for each tire based on $P_V$ in said tires and determining weight of said vehicle $W_V$ based on the equation $$W_V = [C_{F1}(P_{V(S1)}) + C_{F2}(P_{V(S2)}) + C_{F3}(P_{V(S3)}) + \cdots + C_{Fn}(P_{V(Sn)})] - [C_{F1}'(P_{I(S1)}) + C_{F2}'(P_{I(S2)}) + C_{F3}'(P_{I(S3)}) + \cdots + C_{Fn}'(P_{I(Sn)})]$$

Wherein $W_V$ = Vehicle weight $P_{V(S1)}, P_{V(S2)}, +C_{F3} P_{V(S3)}, \cdots P_{V(Sn)}$ = the temperature standardized tire pressures measured with only the weight of the vehicle.

$P_{I(S1)}, P_{I(S2)}, P_{I(S3)}, \cdots (P_{I(Sn)}$ = is the respective initial standardized pressures $P_{I(S)}$ for each of said tires.

Where $C_{F1}, C_{F2}, C_{F3}, \cdots C_{Fn}$ are the conversion factors at the corresponding pressure $P_{V(S1)}, P_{V(S2)}, P_{V(S3)}, \cdots P_{V(Sn)}$, respectively.

$C_{F1}', C_{F2}', C_{F3}' \cdots C_{Fn}'$ are the conversion factors at the corresponding pressure $P_{I(S1)}, P_{I(S2)}, P_{I(S3)}, \cdots P_{I(Sn)}$, respectively.

It is equally apparent that the weight of the cargo $W_C$ may be obtained based on the equation(s)

$$W_C=[C_{F1}(P_{T(S1)})+C_{F2}(P_{T(S2)})+C_{F3}(P_{T(S3)})+\cdots+C_{Fn}(P_{(Sn)})]-[C_{F1}'(P_{V(S1)})+(C_{F2}'(P_{V(S2)})+C_{F3}'(P_{V(S3)})+\cdots+C_{Fn}'(P_{V(Sn)})]$$

Wherein $W_C$=weight of the cargo

FIG. 5 is an example illustrating the individual values $C_{F1}$, $C_{F2}$, $C_{F3}$ - - - $C_{Fn}$, how these values may be obtained and the usefulness of correcting each tire pressure rise due to heating by using individual $C_F$ values and then determining the $P_{T(S)TOTAL}$.

FIG. 5 is based on some experimental data, which show the relationship between the tire pressure and applied load on the tire. The change of tire pressure is recorded with a pressure transducer in a millivoltmeter, which has a sensitivity of 10 µv. Each line in FIG. 5 corresponds to an initial nominal pressure in the range 20 to 40 lbs. This tire is then loaded with weights and the sensor output is recorded. A few points should be noted. All the lines can be represented by an equation, $$y=mx+c,$$

where y is the tire pressure after loading, x is the load, c is the initial tire pressure before loading and m is the slope of the line.

The inverse of slopes (i.e., 1/m) of these lines, are the values of $C_F$ for each initial pressure. In this case, the value of $C_F$ varies from 188 lbs at 20 psi to 322 lbs at 40 psi. This variation is very large if an average value of $C_F$ is chosen there will be large error in the load calculation. Now, consider the following scenario. The initial tire pressure of one tire has gone up from 29 lbs to 32 lbs after loading or driving. The $C_F$ value for this tire pressure is 256 lbs (=1/0.0039) and for another tire it has gone up from 34 psi to 37 psi. The $C_F$ value in this case is 294 lbs (=1/0.0034). This calculation is for two tires only but if there are 10 or 20 tires in a vehicle then the $C_F$ value for each tire can vary from say 250 to 300 lbs, or even more. And if the average value of $C_F$ is 275 lbs, then the error from the lowest to highest values becomes +/−25 lbs, i.e., ~10%, which is not acceptable. This shows that if an average value of $C_F$ is used then the error can be quite large for calculating the total load. Any large variation in the value of $C_F$ can result in large error in load calculation and may not be acceptable. Thus, it is important to have the flexibility of both methods of determining $C_F$, (i) by the method described above and also (ii) correcting each tire for the temperature rise (i.e., pressure rise) individually and then getting the $P_{(S)TOTAL}$.

Description of a physical embodiment the invention

Having described the principles of the system the invention will now be described in relation to the drawings.

Figure 2:
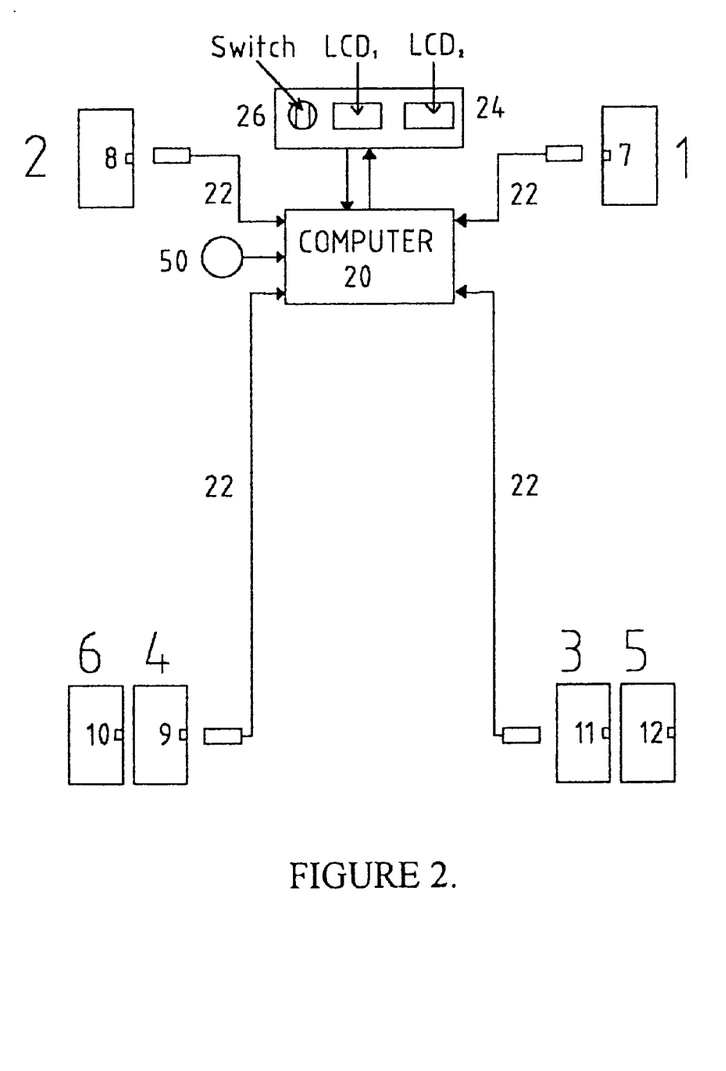
FIG. 2 is a schematic diagram of the various components used to carry out the present invention.

FIG. 1 has been described above. Turning to FIG. 2, the total weight of the vehicle $V_T$ is supported by the tires 1, 2, 3, 4, 5 and 6 (two additional tires are shown in this figure over the arrangement shown in FIG. 1). Each is provided with a sensor 7, 8, 9, 10, 11 and 12, respectively. These sensors each measure both the pressure and the temperature conditions in their respective tires and transmit this information to the on-board computer 20 via suitable communicating channels schematically indicated by the lines 22.

The computer processes the data and store in memory the relevant data and communicates the information to the display consul 24 which contains two separate LCD readouts, LCD, and $LCD_2$. One is to display tire pressures and the other is to display cargo load (including vehicle weight when required). A switch 26 will be used to turn the system from displaying the tire pressures to display the cargo load value and also can be used as an on/off switch.

Figure 4:
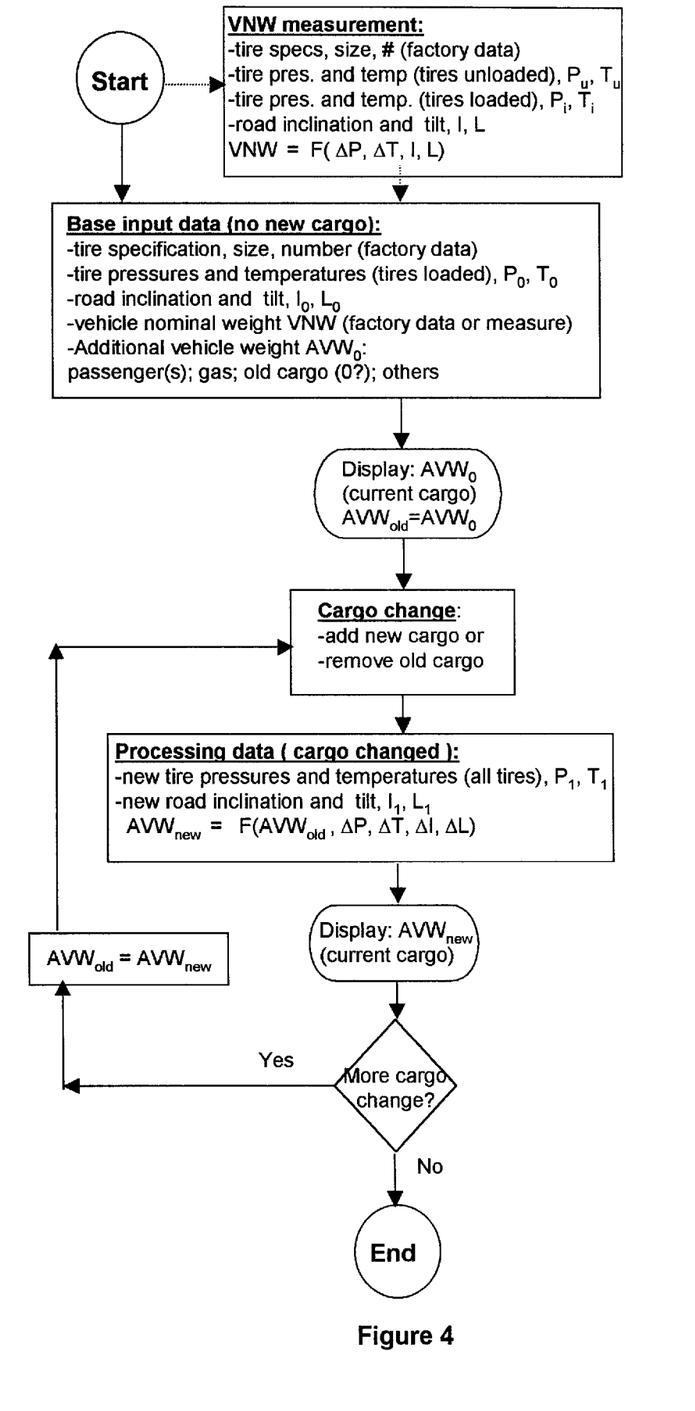
FIG. 4 is a flow chart of the process for determining the vehicle weight based on tire temperature and pressure.

An overall flow diagram is shown in FIG. 4. In this figure, $P_u$ and $T_u$ stand for the pressures and temperatures in the tires when not installed (i.e., uninstalled) on the vehicle or when the vehicle is on a hoist. Similarly, the $P_i$ and $T_i$ stand for the pressures and temperatures of the tires after they are installed on the vehicle and when the vehicle is resting on the ground. $P_o$ and $T_o$ are the pressures and temperatures of the tires (installed on the vehicle) in equilibrium with the outside temperature (I and L stand for inclination and tilt of the ground on which vehicle is standing). Whenever a vehicle is parked and loaded or unloaded, the inclined (and/or tilt) surface may be taken into consideration. After loading or unloading the value of the $P_{(S)TOTAL}$ can be corrected automatically by the inclinometer/tiltmeter 50 (see FIG. 2) or by the program.

Experimental Tests:

An example of such a vehicle weight calculation is shown below. The sensor output is in the form of millivolts per pound of weight. The sensors used in one vehicle and one table model prototype give an output of ~4 mV/pound of air pressure within the tire. Some sensor handbooks show that the millivolt output per pound of air pressure may vary over a wide range. In the example, the total weight of the vehicle is ~2500 lbs and the total tire pressure increase of the 4 wheels is less than 3 lbs (due to the weight of the car); the total sensor output from the four tires increases by about 10 mV (for ~2500 lbs load). The 10 mV output is easily recorded on a millivoltmeter and LCD, which is then used to calculate the weight of the vehicle. This principle can also be applied to the cargo load on a truck. Tests show that the sensor used can detect a load of as little as 2 lbs.

There are millivoltmeters that can detect as little as 10 µV and even ordinary millivoltmeters should be able to provide accurate readings of 0.1 mV. LCD meters of this sensitivity and accuracy are commercially available.

Other Applications:

The same system can be similarly adapted for use in substantially any vehicle that is supported by inflated tires including trailers, airplanes, etc.

Having described the invention, modifications will be evident to those skilled in the art without departing from the spirit of the invention as defined in the appended claims

I claim:

1. A method for measuring the weights of a vehicle based on change in tire pressure comprising, measuring tire pressure and temperature of at least a significant number of tires on a vehicle, determining a temperature standardized pressure $P_{(S)}$ based on a selected standard temperature for each tire, totaling said temperature standardized pressures for said tires $P_{(S)TOTAL}$ and determining total weight $W_{TOTAL}$ of said vehicle based on $$W_{TOTAL}=C_F(\Delta P_{(S)TOTAL})$$

Where $W_{TOTAL}$ total weight of said vehicle $\Delta P_{(S)TOTAL}$=total or summation of all of said temperature standardized tire pressures $P_{(S)}$ less the summation $P_{I(S)TOTAL}$ of the initial tire pressures $P_I$ measured with no load on the tires converted to temperature standardized pressures $P_{I(S)}$ and summed to provide a summation of initial pressures $P_{I(S)TOTAL}$ $C_F$=a conversion factor in weight/unit change of standardized tire pressures and wherein said total weight $W_{TOTAL}$ of a vehicle including cargo load if any is based on the equation $$C_{FT}\Delta P_{(ST)TOTAL} = C_{F1}(\Delta P_{(S1)}) + C_{F2}(\Delta P_{(S2)}) + C_{F3}(\Delta P_{(S3)}) + \cdots + C_{Fn}(\Delta P_{(Sn)})$$

Where $\Delta P_{(ST)TOTAL}$ the sum or the total of the temperature corrected changes in all the individual tire pressures.

$C_{FT}$=a conversion factor based on change in weight/unit change of standardized tire pressures based on the weighted average of $C_{F1}$, $C_{F2}$, $C_{F3}$ - - - $C_{Fn}$ and is in effect equivalent to $C_{FT} = [(C_{F1}(\Delta P_{(S1)}) + C_{F2}(\Delta P_{(S2)}) + C_{F3}(\Delta P_{(S3)}) + \cdots + C_{Fn}(\Delta P_{(Sn)})] / \Delta P_{(ST)TOTAL} C_{F1}$, $C_{F1}$, $C_{F2}$, $C_{F3}$ - - - $C_{Fn}$ are predetermined specific values of a conversion factor $C_F$ for each of the tires 1, 2, 3 - - - n respectively.

2. A method for measuring the weight of a vehicle based on change in tire pressure as defined in claim 1 further comprising determining said weight of the vehicle alone $W_V$ by initially measuring initial tire pressure $P_I$ of each said tire under conditions of no load, determining said temperature standardized initial pressure $P_{I(S)}$ for said selected standard temperature for each of said tires, measuring pressure $P_V$ in said tires when said tires are subject only to the weight of the vehicle $W_{(V)}$ and determining a standardized pressure $P_{V(S)}$ for each said tire based on $P_V$ in said tires and determining weight of said vehicle $W_V$ based on the equation $$W_V = [C_{F1}(P_{V(S1)}) + C_{F2}(P_{V(S2)}) + C_{F3}(P_{V(S3)}) + \cdots + C_{Fn}(P_{V(Sn)})] - [C_{F1}'(P_{I(S1)}) + C_{F2}'(P_{I(S2)}) + C_{F3}'(P_{I(S3)}) + \cdots + C_{Fn}'(P_{I(Sn)})]$$

Wherein $W_V$=Vehicle weight $P_{V(S1)}$, $P_{V(S2)}$, $C_{F3}$ $P_{V(S3)}$, - - - $P_{V(Sn)}$=the temperature standardized tire pressures measured with the weight of the vehicle only, $P_{I(S1)}$, $P_{I(S2)}$, $P_{I(S3)}$, - - - $P_{I(Sn)}$=the respective initial standardized pressures $P_{I(S)}$ for each of said tires, Where $C_{F1}$, $C_{F2}$, $C_{F3}$, - - - $C_{Fn}$ are the conversion factors at the corresponding pressure $P_{V(S1)}$, $P_{V(S2)}$, $P_{V(S3)}$, - - - $P_{V(S3)}$, respectively, $C_{F1}'$, $C_{F2}'$, $C_{F3}'$ - - - are the conversion factors at the corresponding pressure $P_{I(S1)}$, $P_{I(S2)}$, $P_{I(S3)}$, - - - $P_{I(Sn)}$, respectively.

3. A method for measuring the weight of a vehicle based on change in tire pressure as defined in claim 2 further comprising determining said weight of cargo $W_C$ is based on the equation $$W_c = [C_{F1}(P_{T(S1)}) + C_{F2}(P_{T(S2)}) + C_{F3}(P_{T(S3)}) + \cdots + C_{Fn}(P_{Sn})] - [C_{F1}'(P_{V(S1)}) + C_{F2}'(P_{V(S2)}) + C_{F3}'(P_{V(S3)}) + \cdots C_{Fn}'(P_{V(Sn)})]$$

Wherein $W_C$=weight of the cargo $P_{T(S1)}$, $P_{T(S2)}$, $P_{T(3)}$, - - - $P_{T(Sn)}$=the temperature standardized pressures measured under full (total) load (i.e. vehicle plus cargo), $P_{V(S1)}$, $P_{V(S2)}$, $P_{V(S3)}$, - - - $P_{V(Sn)}$=the temperature standardized tire pressures measured with only the weight of the vehicle, $C_{F1}$, $C_{F2}$, $C_{F3}$ - - - $C_{Fn}$ are the conversion factors at the corresponding pressure $P_{T(S1)}$, $P_{T(S2)}$, $P_{T(S3)}$, - - - $P_{T(Sn)}$, respectively $C_{F1}'$, $C_{F2}'$, $C_{F3}'$ - - - $C_{Fn}'$ are the conversion factors at the corresponding pressure $P_{V(S1)}$, $P_{V(S2)}$, $P_{V(S3)}$, - - - $P_{V(Sn)}$, respectively.

4. A method for measuring the weight of a Vehicle based on change in tire pressure as defined in claim 1 further comprising determining the weight of the vehicle alone $W_V$ and determining the weight of cargo $W_C$ based on $W_C = W_{TOTAL} - W_V$ and wherein said total weight $W_{TOTAL}$ of a vehicle including cargo load if any is based on the equation $$C_{FT}\Delta P_{(ST)TOTAL} = C_{F1}(\Delta P_{(S1)}) + C_{F2}(\Delta P_{(S2)}) + C_{F3}(\Delta P_{(S3)}) + \cdots + C_{Fn}(\Delta P_{(Sn)})$$

Where $\Delta P_{(ST)TOTAL}$=the sum or the total of the temperature corrected changes in all the individual tire pressures, $C_{FT}$=a conversion factor based on change in weight/unit change of standardized tire pressures based on the weighted average of $C_{F1}$, $C_{F2}$, $C_{F3}$ - - - $C_{Fn}$ and is in effect equivalent to $C_{FT} = [C_{F1}(\Delta P_{S1}) + C_{F2}(\Delta P_{(S2)}) + C_{F3}(\Delta P_{(S3)}) + \cdots + C_{Fn}(\Delta P_{(Sn)})]/\Delta P_{(ST)TOTAL}$ $C_{F1}$, $C_{F2}$, $C_{F3}$ - - - $C_{Fn}$ are predetermined specific values of a conversion factor $C_F$ for each of the tires 1, 2, 3 - - - n respectively.

5. A method for measuring the weight of a vehicle based on change in tire pressure as defined in claim 4 further comprising determining said weight of the vehicle alone $W_V$ by initially measuring initial tire pressure $P_I$ of each said tire under conditions of no load, determining said temperature standardized initial pressure $P_{I(S)}$ for said selected standard temperature for each of said tires, measuring pressure $P_V$ in said tires when said tires are subject only to the weight of the vehicle $W_{(V)}$ and determining a standardized pressure $P_{V(S)}$ for each said tire based on $P_V$ in said tires and determining weight of said vehicle $W_V$ based on the equation $$W_V[C_{F1}(P_{V(S1)}) + C_{F2}(P_{V(S2)}) + C_{F3}(P_{V(S3)}) + \cdots + C_{Fn}(P_{V(Sn)})] - [C_{F1}'(P_{I(S1)}) + C_{F2}'(P_{I(S2)}) + C_{F3}'(P_{I(S3)}) + \cdots + C_{Fn}'(P_{I(Sn)}')]$$

Wherein $W_V$=Vehicle weight $P_{V(S1)}$, $P_{V(S2)}$, $+C_{F3}$ $P_{V(S3)}$, - - - $P_{V(Sn)}$=the temperature standardized tire pressures in each tire measured with the weight of the vehicle only, $P_{I(S1)}$, $P_{I(S2)}$, $P_{I(S3)}$, - - - $P_{I(Sn)}$=is the respective initial standardized pressures $P_{I(S)}$ for each of said tires, Where $C_{F1}$, $C_{F2}$, $C_{F3}$, - - - $C_{Fn}$ are the conversion factors at the corresponding pressure $P_{V(S1)}$, $P_{V(S2)}$, $P_{V(S3)}$, - - - $P_{V(Sn)}$, respectively)

$C_{F1}'$, $C_{F2}'$, $C_{F3}'$ - - - $C_{Fn}'$ are the conversion factors at the corresponding pressure $P_{I(S1)}$, $P_{I(S2)}$, $P_{I(S3)}$, - - - $P_{I(Sn)}$, respectively.

6. A method for measuring the weight of a vehicle based on change in tire pressure as defined in claim 5 further comprising determining said weight of cargo $W_C$ is based on the equation $$W_c = [C_{F1}(P_{T(S1)}) + C_{F2}(P_{T(S2)}) + C_{F3}(P_{T(S3)}) + \cdots + C_{Fn}(P_{(Sn)}] - [C_{F1}(P_{V(S1)}) + C_{F2}'(P_{V(S2)}) + C_{F3}'(P_{V(S3)}) + \cdots + C_{Fn}'(P_{V(Sn)})]$$

Wherein $W_c$=weight of the cargo $P_{T(S1)}$, $P_{T(S2)}$, $P_{T(S3)}$, - - - $P_{T(Sn)}$=the temperature standardized pressures measured under fall (total) load (i.e. vehicle plus cargo), $P_{V(S1)}$, $P_{V(S2)}$, $P_{V(S3)}$, - - - $P_{V(Sn)}$=the temperature standardized tire pressures measured with only the weight of the vehicle, $C_{F1}$, $C_{F2}$, $C_{F3}$, - - - $C_{Fn}$ are the conversion factors at the corresponding pressure $P_{T(S1)}$, $PT(S2)$, $P_{T(S3)}$, - - - $P_{(Sn)}$, respectively, $C_{F1}'$, $C_{F2}'$, $C_{F3}'$ - - - $C_{Fn}'$ are the conversion factors at the corresponding pressure $P_{V(S1)}$, $P_{V(S2)}$, $P_{V(S3)}$, - - - $P_{V(Sn)}$, respectively.

\* \* \* \* \*